Figure 1:
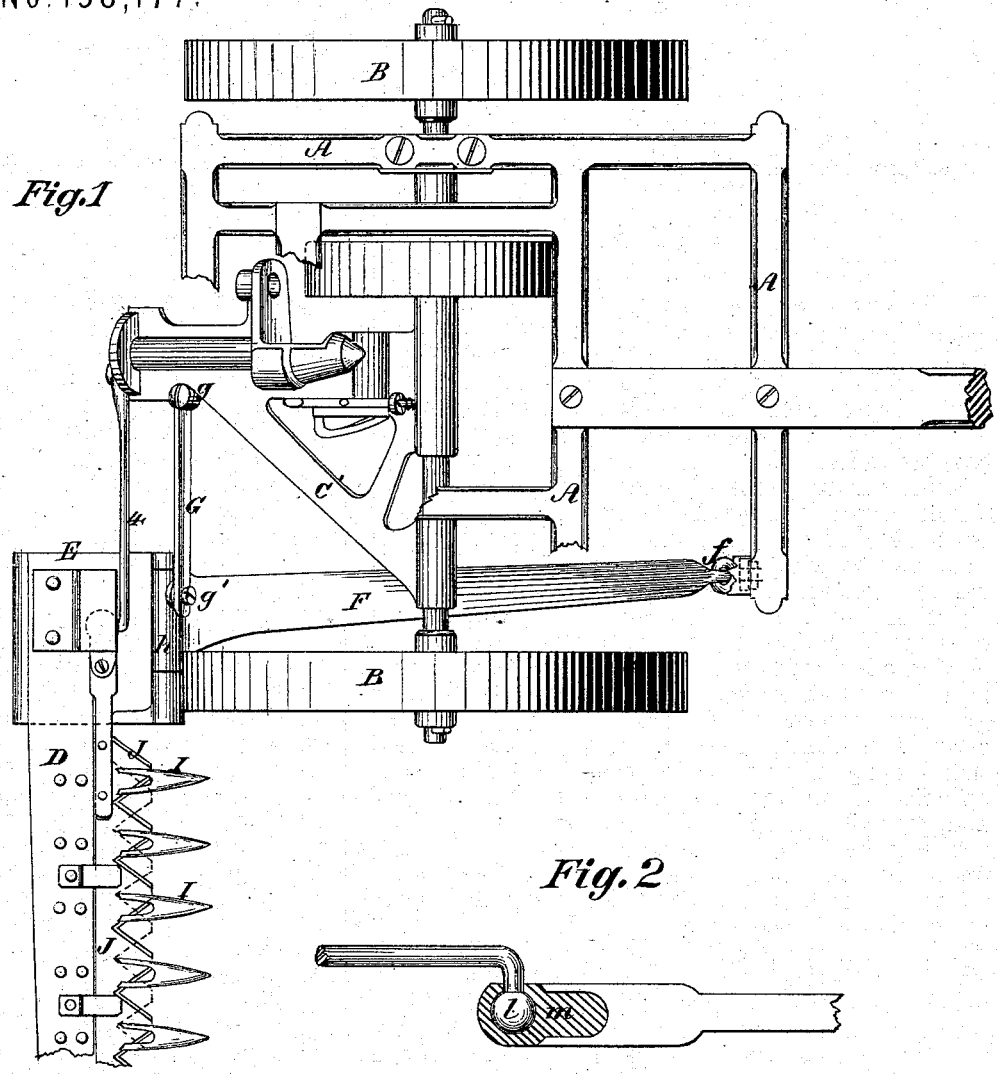

J. P. MANNY.
Harvesters.

No. 158,177.  Patented Dec. 29, 1874.

Witnesses:—
W. H. Rowe,
Edwd. C. Davidson

Inventor:—
John P. Manny

UNITED STATES PATENT OFFICE

JOHN P. MANNY, OF ROCKFORD, ILLINOIS.

IMPROVEMENT IN HARVESTERS.

Specification forming part of Letters Patent No. 158,177, dated December 29, 1874; application filed April 17, 1871.

CASE C.

*To all whom it may concern:*

Be it known that I, JOHN P. MANNY, of Rockford, in the county of Winnebago and State of Illinois, have invented a new and useful Improvement in Harvesting-Machines, of which the following is a full, clear, and exact description:

My invention relates to that class of machines known as hinged-bar harvesters, in which the body of the machine is supported upon two wheels; and it has for its object, first, to compensate for the loss of tractive power that arises from the use of two driving or supporting wheels, as compared with those machines in which the weight of the structure is thrown either wholly or mainly upon a single driving-wheel, which is a defect in this class of machines, as heretofore operated, that largely, if not wholly, neutralizes the peculiar advantages that characterize them; and, secondly, to secure, in such machines, increased flexibility in the joint between the frame and the cutting apparatus, so that the latter may conform in its movements as nearly as possible to the constantly-varying inequalities in the surface of the ground with the least strain upon the parts, and the smallest amount of friction between the cutters and the finger-beam.

It is well understood among the manufacturers of harvesters, and among persons acquainted with their practical use, that, when the weight of the machine is thrown upon two supporting-wheels, whether one or both of them are driving-wheels, there is a great loss of tractive power, as compared with those machines in which the weight is thrown largely or wholly upon a single driving-wheel. This diminished traction arises from the circumstance of diminished weight upon that wheel, which, for the moment, is acting as a driver. In those two-wheeled machines in which one of the wheels is a supporting-wheel only, this diminution of weight upon the driving-wheel is the constant condition of things; and in those two-wheeled machines in which both wheels are drivers it is seldom the case that both wheels are acting in harmony in the propulsion of the cutters. Any rising or falling of the one wheel, as compared with the other, or any change in the direction of the machine, or any wabbling of the machine in its path, caused by the unevenness of the ground, or the unsteadiness of the team, throws the entire work upon the one wheel, while the other one is caused to slip upon its backing-ratchet. This condition of things is constantly recurring, and, of course, the tractive power available for the propulsion of the cutters is only that due to the weight that is for the time being supported upon that wheel which is held fast upon the axle. The consequence of this is, that the tractive power of the driving-wheels in the ordinary two-wheeled harvester is so nearly exhausted in giving to the cutters the length and rapidity of vibration heretofore considered essential as to leave comparatively a small amount with which to do the actual cutting or severing of the blades of grass or grain. This fact is illustrated by the well-known necessity for these machines to back off in order to get a running start whenever the crop is heavy, by their frequent stopping when the grain or grass is lodged and tangled, and by their inability to operate when the blades are dull, in all of which particulars they compare unfavorably, and for the reason above indicated, with the one-wheeled harvester. The only methods within my knowledge heretofore employed to compensate for this loss of power in the two-wheeled machine are, first, to set the guards as close together as the practical operation of the machine will permit; and, secondly, to reduce the weight of the pitman, cutter-bar, and the knives, making them as light as possible, and causing them to run loosely in their bearings and through the guards, so as to reduce the friction to a minimum. By reducing the distance of the guards the throw of the cutters can be correspondingly reduced, and, of course, the leverage of the driving-wheel increased to the same degree; but experience shows that there is a practical limit to this approximation of the guards, in consequence of which the possible increase of leverage arising from this source is confined within very narrow bounds. For instance, with the guards heretofore usually employed on hinged-bar machines, it has been found necessary to place them so that their points would be not less than about three and a half inches apart. Owing to the absence of the reel used on the one-wheeled rigid-bar machine, they will not, if brought much nearer together than this, pass through the thick and tangled portions of the crop. As, prior to my invention, it had been deemed necessary for the cutter-bar to have a sufficient length of vibration to enable the blades to cut at least from center to center of the guards, (in fact the throw of the sickle generally being in excess of this amount,) it had not been found practicable to reduce the length of the crank below one and three-fourths of an inch; and this had proved insufficient to compensate for the loss of tractive power in the use of two wheels, and thus prevent the evils, hereinbefore enumerated, resulting therefrom.

Whenever, again, it had been sought to compensate for this loss of tractive power by making the cutters run lighter—i. e., by diminishing the weight of the cutter-bar and the knives and causing them to move freely in and through their guards and bearings—this had been found to interfere with the proper shearing action which it is desirable to maintain between the blades and the edges of the guards; and, as a result, it had been found necessary to gear up the cutters so as to run with an increased rate of vibration, and thus aid the imperfect shearing action by accumulating sufficient momentum upon the cutters to strike off the stalks of grain and grass. The increased rate of vibration necessary to this purpose caused great wear and rapid deterioration of the parts, and at the same time was far from effective in overcoming the defects incident to the construction and use of two-wheeled harvesters.

By the improvement which constitutes my present invention, I largely reduce the length of stroke from the minimum heretofore attained in this class of machines, and, at the same time, by the increased leverage thus secured, am enabled to perfect the shearing action of the blades upon the edges of the guards, the result of which is that the number of vibrations of the cutters to each revolution of the driving-wheel may be considerably lessened, with a consequent saving of power and diminution of strain and wear of the parts.

The fundamental principle of my improvement consists in causing the knives to reciprocate from edge to edge only of the guards, instead of reciprocating, as heretofore, from center to center, or passing entirely through the guards. In carrying out this idea of allowing the blade to advance only to the edge of the guards, instead of passing into its center or through it, it becomes necessary to employ a forked cap upon the guard. If the ordinary solid cap were used, it would be impracticable to limit the movements of the blades as indicated—i. e., to employ my improvement which I denominate the "short stroke"—since the grass and gums would accumulate in the slots of the guards and impede the working of the machine. With the forked cap, on the other hand, the matter that may chance to be carried into the guards will readily escape through the openings formed by the forks. These guards should also be open at the rear, after the manner of ordinary open-slotted guards.

The saving of power effected by the use of the "short stroke" in this class of machines may be calculated as follows: Heretofore the throw of the blades being from center to center of the guards, they have been required to move at a single reciprocation over a distance equal in the aggregate to the width of the swath cut.

In using my improvement, I have found it practicable to employ guards one and one-sixteenth inch in width. These guards I place at the usual distance of three and one-half inches apart, the blades or sections of the cutters having a corresponding length at their base. The blades, when new, are one-half inch across at their points, and as they reciprocate only from edge to edge of the guards— i. e., so that the point of the blade will meet the edge of the guard on either side of the space between any two adjacent guards—it follows that the individual blades will have to traverse at each reciprocation but one and fifteen-sixteenths of an inch, and that the aggregate movement of the seventeen blades necessary to cut a swath fifty-nine and one-half inches wide will be about thirty-three inches, which, it will be seen, is but slightly in excess of one-half the width of the swath. The immense gain in leverage arising from this very large percentage of decrease in the movement of the cutters fully compensates for the loss of tractive power connected with the use of two supporting-wheels, and, of course, enables the machine to operate with very much less strain and wear upon the parts than if the long crank were used. A still further diminution in the strain and wear of the parts arises from the fact that the perfecting of the shearing action of the blades and guards, which results from the gain in leverage, as above explained, enables me materially to diminish the number of vibrations of the cutter-bar to each revolution of the driving-wheel. While the ordinary machines have to run with about forty-six vibrations of the cutters to one revolution of the wheel, some machines going as high as fifty-six vibrations, with my improvement of the "short stroke" I find thirty-four vibrations amply sufficient for most practical purposes.

Another great advantage arising from my improved mode of operating hinged-bar harvesting-machines consists in the increased flexibility of the joint between the cutting apparatus and the frame. This joint, as ordinarily constructed, consists of two elements: First, the hinge formed by the connection of the pitman with the heel of the cutter-bar; and, secondly, the hinge between the inner end of the finger-beam and the frame. It is, of course, impossible to preserve exact coincidence between these two elements of this compound joint during an entire reciprocation of the cutters; but the shorter the range of the vibration, the smaller will be the divergence of the two joints, and the flexibility of the cutting apparatus will be proportionately increased.

The value of this element in my improvement will be the more apparent when it is considered that the crank-shaft is always placed at a higher elevation than the inner end of the finger-beam, in consequence of which the pitman has a downward thrust upon the face of the finger-beam, even when the finger-beam lies in its normal—that is, in a horizontal — plane. The resistance arising from this downward thrust is augmented whenever the heel of the beam falls below its normal plane, or its outer end is thrown above it, and not infrequently, under such circumstances, when the long crank is used, this resistance increases to such an extent as to be in excess of the yielding that takes place in the various connections of the mechanism, and then the vibration of the cutters wholly ceases; and, even when the vibration of the cutters is not wholly stopped from this cause, the strain upon the parts must necessarily be greater than when the machine is run with the diminished throw of the cutters that constitutes my improvement in the art.

In applying this improvement to the working of those machines in which there is no fixed relation between the crank-shaft and the guards for the varying elevation at which the cutting apparatus is caused to act, it becomes necessary to interpose between the cutting apparatus and the main frame a compensating mechanism to prevent the slipping of the cutters upon the finger-beam with every change in elevation.

In the drawings hereto attached, I have shown a machine in which the coupling-frame is so constructed as to serve as such compensating mechanism and maintain the relation of the crank-shaft and the guards as the finger-beam oscillates up and down; but I do not propose to limit myself to the use of this particular device, since my invention does not consist in the special means employed for effecting this subsidiary object which becomes necessary in my improved mode of using certain kinds of the two-wheeled harvesters, but rather in the general discovery and application of the peculiar advantages attending the improved mode hereinbefore set forth of operating the cutters of the entire class of two-wheeled machines.

In the accompanying drawings so much only of a harvester is shown as is necessary to illustrate the improvement in the art which constitutes my invention, in its application to a machine in which there is no fixed relation between the crank-shaft and the guards.

Figure 2:
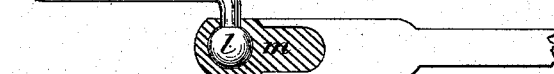
Figure 3:
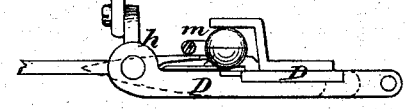

Figure 1 is a plan view of the machine, the dotted lines showing the limit of vibration of the cutters. Figs. 2 and 3 show the details of a ball-and-socket connection between the pitman and the cutter-bar, Fig. 3 also showing a side elevation of the shoe and its connections; but the ball-and-socket connection is not claimed in this application. The ball-and-socket joint here shown is the preferred form of joint between the pitman and the cutter-bar; but the invention is by no means to be limited to the presence of this particular joint, since any other operative connection might, if desired, be substituted therefor.

In the particular machine here shown a main frame, A, is mounted on two wheels, B B. A gear-frame, $C'$, vibrates around the main axle. A finger-beam, D, is secured to the shoe E, which is pivoted in front of the front edge of the cutters to a drag-bar, F, by a joint, $h$, parallel with the finger-beam. This drag-bar is pivoted by means of a swivel, $f$, to the under side of the inner front corner of the main frame. A coupling-arm, G, is pin-jointed at one end to the gear-frame by a vertical pin, $g$, which forms a joint flexible horizontally but rigid vertically. The outer end of the coupling-arm is pin-jointed to the rear end of the drag-bar by a horizontal pin, $g'$, which allows the joint free vertical flexure. The gear-frame $C'$, it will be seen, swings on the main axle, while the drag-bar oscillates around a point in front of and eccentric to that axle. The mode of pivoting the coupling-arm here shown insures the coincident vertical movement of the drag-bar and the gear-frame, and thus maintains the relation of the crank-shaft to the guards at the various elevations of the inner end of the cutting apparatus. The connection of the cutter-bar and blades, the construction of the guards, and the ball-and-socket joint between the pitman and the cutter-bar, are sufficiently illustrated in the drawings, and require no special description. In order to compensate for the change of form which the knives undergo in grinding, I provide, in the well-known mode of constructing the crank-head, for setting the crank-pin at slightly-different distances from the center of the head, but always aiming to preserve the fundamental feature of my improvement, which consists in causing the blades to traverse from edge to edge of the guards.

What is claimed as new is —

The combination, in a two-wheeled harvesting-machine, of a hinged finger-beam, open-slotted guard-fingers provided with forked caps, and scalloped cutters reciprocating from edge to edge of the guards, these several members being constructed and arranged to operate in combination, substantially as and for the purpose set forth.

In testimony whereof I have hereunto subscribed my name.

JOHN P. MANNY.

Witnesses:
 JOE I. PEYTON,
 BALTIS DE LONG.